United States Patent [19]

Carrigan

[11] Patent Number: 5,209,050
[45] Date of Patent: May 11, 1993

[54] MOWER WHEEL ASSEMBLY

[76] Inventor: Tracy Carrigan, 1902 Cumberland Rd., Lansing, Mich. 48906

[21] Appl. No.: 787,494

[22] Filed: Nov. 4, 1991

[51] Int. Cl.⁵ .......................................... A01D 34/82
[52] U.S. Cl. .................................. 56/16.7; 56/320.1; 56/322; 172/608; 172/610; 301/48; 301/5.1
[58] Field of Search ................ 56/1, 14.7, 16.7, 320.1, 56/320.2, 322, DIG. 19; 172/538, 547, 559, 606, 608, 610; 301/5 P, 5 R, 45, 48; 305/12, 13

[56] References Cited

U.S. PATENT DOCUMENTS

| | | | |
|---|---|---|---|
| 1,167,400 | 1/1916 | Gobiet | 172/547 X |
| 1,459,190 | 6/1923 | Walker | 301/48 |
| 1,997,835 | 4/1935 | Sandherr | 301/48 |
| 3,005,302 | 10/1961 | Lucia et al. | 56/320.1 |
| 3,927,513 | 12/1975 | Ramaker et al. | 56/320.1 |
| 4,589,252 | 5/1986 | Williams | 56/16.7 X |
| 4,977,733 | 12/1990 | Samejima et al. | 56/14.7 |
| 5,029,945 | 7/1991 | Kidwell et al. | 301/48 X |

Primary Examiner—George A. Suchfield
Attorney, Agent, or Firm—Dykema Gossett

[57] ABSTRACT

The present invention relates to the wheel assembly of mowers, particularly to mulching mowers. In the preferred embodiment, each wheel assembly includes a clearing disc sandwiched between a pair of support wheels. The support wheels support the weight of the lawn mower. The clearing disc clears accumulated grass from the wheel assembly by moving between the support wheels as the wheels rotate to clear away grass clippings. The clearing disc has an outside diameter that is greater than the outside diameter of the support wheels and is mounted between the wheels in such a way that the clearing disc continually moves upwardly as the mower is moved.

18 Claims, 3 Drawing Sheets

MOWER WHEEL ASSEMBLY

BACKGROUND

The present invention relates to mowers generally and to mulching mowers more particularly and more specifically to the wheel assembly of the mower.

As is well known, mulching mowers without a grass collector, have a problem with the accumulation of grass on the wheels of the mower. This is also a problem with regular mowers when they are used for example on damp or long grass. If the grass is not collected from the lawn, the cut grass left from the wheels, in the form of strips or clumps, will turn brown in two or three days, leaving unsightly rows, the width of the tires.

SUMMARY OF THE INVENTION

The present invention overcomes the above problem by clearing the wheels of the mower on each revolution to reduce if not entirely prevent the accumulation of grass. In this way, there is little, if any, clumping of the grass. This permits the mulching mower to properly fertilize the lawn. If the invention is used on a normal lawn mower it will have the same effect and reduce if not eliminate the clumping of grass resulting in a well manicured lawn without unsightly clumps or rows of accumulated grass clippings.

In the preferred embodiment of this invention, each wheel assembly includes a clearing disc sandwiched between a pair of support wheels. The support wheels support the weight of the lawn mower. The clearing disc clears accumulated grass from the wheel assembly by moving between the support wheels as the wheels rotate to clear away grass clippings.

The clearing disc has an outside diameter that is greater than the outside diameter of the support wheels and is mounted between the wheels in such a way that the clearing disc continually moves upwardly as the mower is moved. In this way, the clearing disc and the support wheels are resting on the lawn at the bottom of the wheel assembly. As one follows the perimeter of the wheel assembly upwardly in a direction opposite to the direction the mower is moving, the edge of the clearing disc begins to be spaced from the edge of the support wheels. At the top of the wheel assembly, the distance between the edge of the clearing disc and the edge of the support wheels is greatest. As one continues to follow the perimeter of the assembly, the distance between the edge of the clearing disc and the edge of the support wheels begins to approach zero. The distance is once again zero or possibly less when the bottom of the wheel assembly is reached. The clearing disc can be less than zero because it does not support any weight of the lawn mower. The negative distance will depend on the surface on which the mower is resting. This describes a cycle that repeats itself every time the wheel of the mower rotates.

In the preferred wheel assembly of the present invention the support wheels may be sandwiched apart by a spacer to which the support wheels are mounted. In this embodiment, the clearing disc is defined by an annular ring with the inside diameter being greater than the outer diameter of the spacer means so that the clearing disc is permitted to float with respect to the spacer means and the support wheels. The clearing disk is mounted on the spacer means between the support wheels. In this way, the clearing disc can cycle as the wheels rotate.

In a further embodiment, the support wheels and the spacer are formed integrally and the clearing disc is an annular ring that is received between the support wheels and about the spacer. In another embodiment, the support wheels may be sandwiched between two clearing discs to accomplish the same results.

A still further embodiment of the present invention employs a rod that is received in the space between the support wheels. This rod clears the grass as it accumulates on the support wheels.

DETAILED DESCRIPTION OF THE INVENTION

Figure 1:
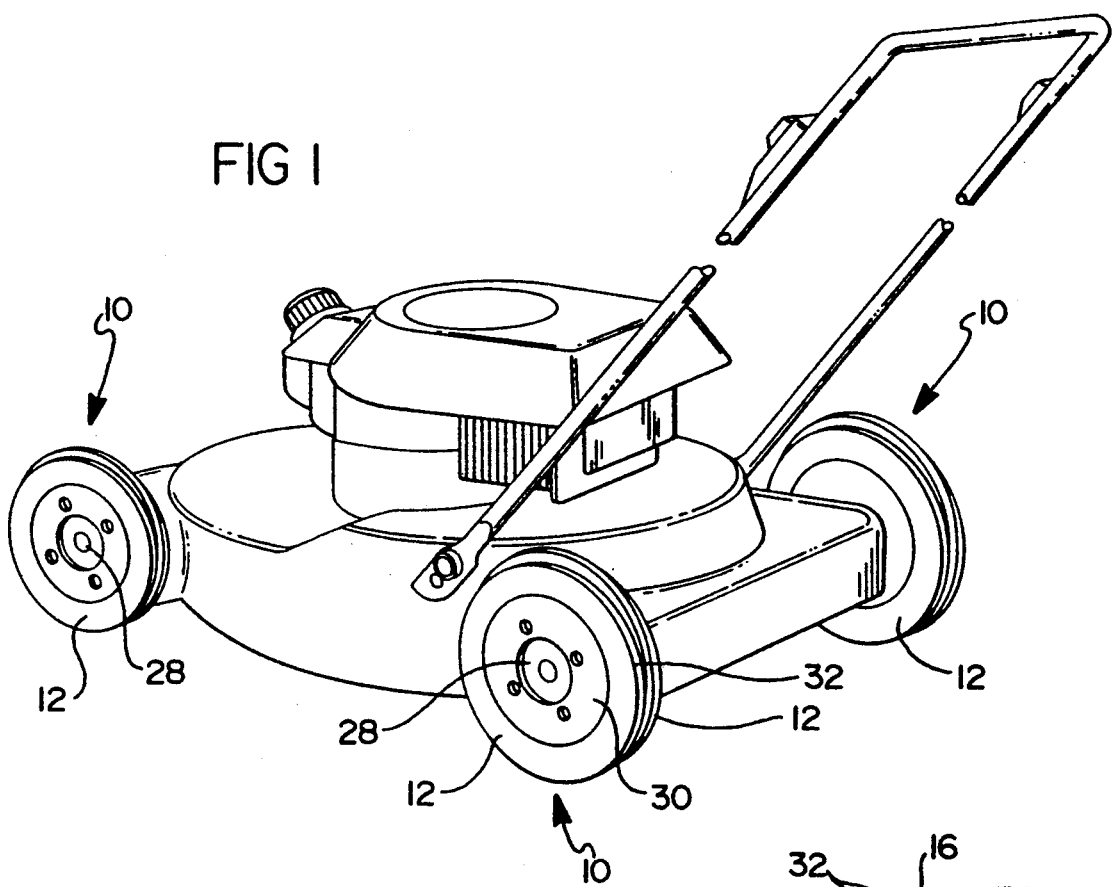
FIG. 1 is a perspective view of the wheel assembly of the present invention mounted upon a mower.
Figure 2:
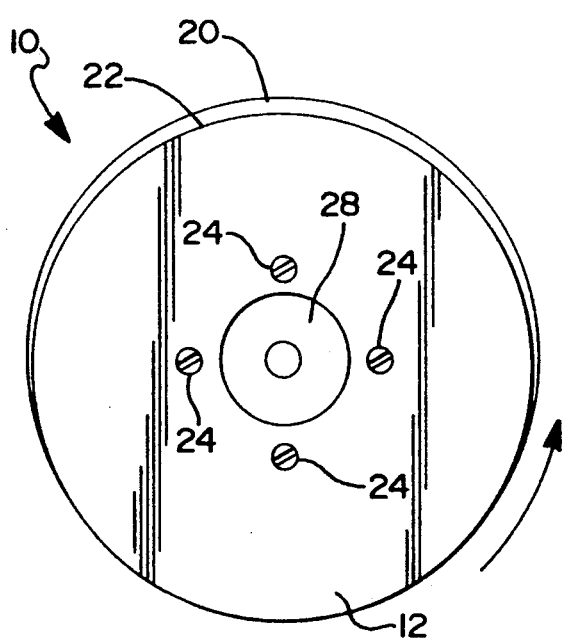
FIG. 2 is a plan view of a first embodiment of the wheel assembly of the present invention.
Figure 3:
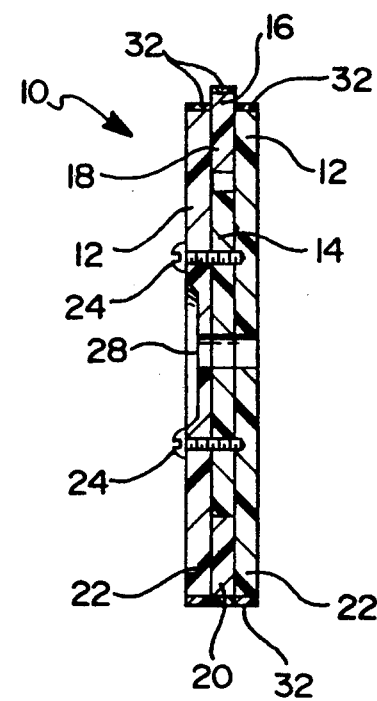
FIG. 3 is a cross-sectional view of the wheel assembly of FIG. 2.

A first embodiment of the wheel assembly of the present invention is shown generally at 10 in FIGS. 1, 2 and 3. Wheel assembly 10 includes outer support wheels 12 mounted to a spacer means 14. As can be seen, there is space between the support wheels 12 due to the support wheels 12 having a greater outside diameter than the outside diameter of spacer means 14.

A clearing disc 16 is rotatably received upon spacer means 14 within the space between the support wheels 12. The clearing disc 16 is annular, having an outside diameter that is greater than the outside diameter of support wheels 12, and an opening 18 that has a diameter that is greater than the outside diameter of spacer means 14. Due to the dimensions of the clearing disc 16, support wheels 12 and the spacer means 14, the clearing disc 16 is free to float with respect to the support wheels 12 and push any grass that is accumulating off of the wheel assembly 10.

As shown in FIGS. 2 and 3, the clearing disc 16 and the support wheels 12 are resting on the lawn at the bottom of the wheel assembly and the edge 20 of the clearing disc 16 and edges 22 of support wheels 12 are together. As one follows the perimeter of the wheel assembly 10 upwardly in a direction opposite to the direction the mower is moving (as shown by the arrow), the edge 20 of the clearing disc 16 begins to be distanced from the edge 22 of the support wheels 12. At the top of the wheel assembly, the distance between the edge 20 of the clearing disc 16 and the edge 22 of the support wheels 12 is greatest. As one continues to follow the perimeter of the wheel assembly 10, the distance between the edge 20 of the clearing disc 16 and the edge 22 of the support wheels 12 begins to approach zero. The distance is once again zero or less when the bottom of the wheel assembly is reached. It is important to note that the clearing disc 16 is not intended, in the preferred embodiment, to support the mower. The only load the clearing discs 16 take are their own actual weight. This allows the discs 16 to slip more freely and it has been found that they perform better due to being free. The above describes a cycle that repeats itself every time the wheel assembly 10 of the mower rotates.

The wheel assembly 10 of FIG. 1 can be assembled by first mounting a support wheel 12 to the spacer means 14 such that the two are coaxially mounted. The clearing disc 16 is then positioned, over the spacer means 14 and, the last support wheel 12 is coaxially mounted to the spacer means 14.

Figure 6:
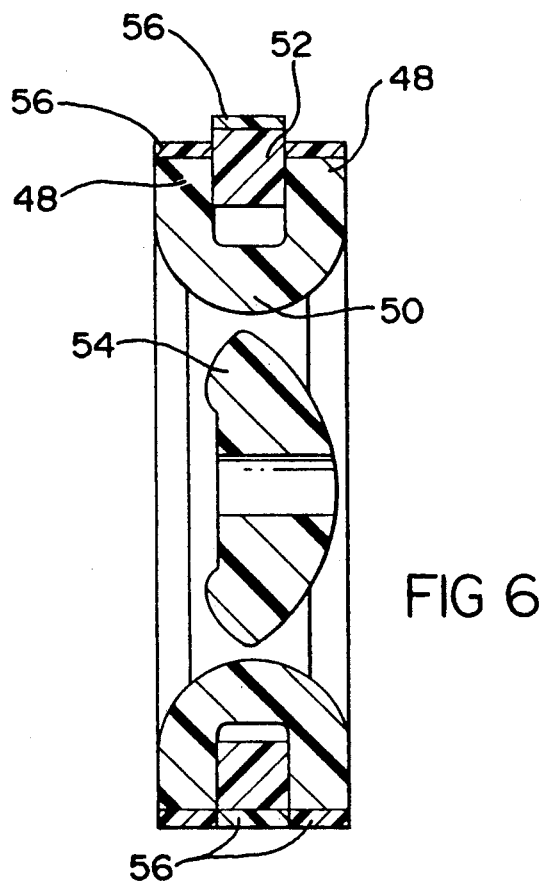
FIG. 6 is a cross-sectional view of another embodiment of the present invention using an integrally formed spacer and support wheels.

The mounting wheels and spacer means can be attached by for example using screws 24 or bolts or other known attaching means. An example of another attaching means would be a mounting spool held in place by a truarc ring and receiving groove. As shown in FIG. 6, the support wheels and spacers can be formed as a single unitary piece. Additionally, the wheel assemblies of each of the illustrated embodiments have a mounting means 28 for mounting the wheel assembly 10 to a mower. The mounting hub 28 will vary depending upon the type of mower on which the wheel assembly 10 is to be mounted. In the preferred embodiment, the wheel assemblies include a rim 30, typically made of metal, and a tire 32, typically formed of rubber, mounted on the rim 30 and on the clearing disc 16.

Figure 4:
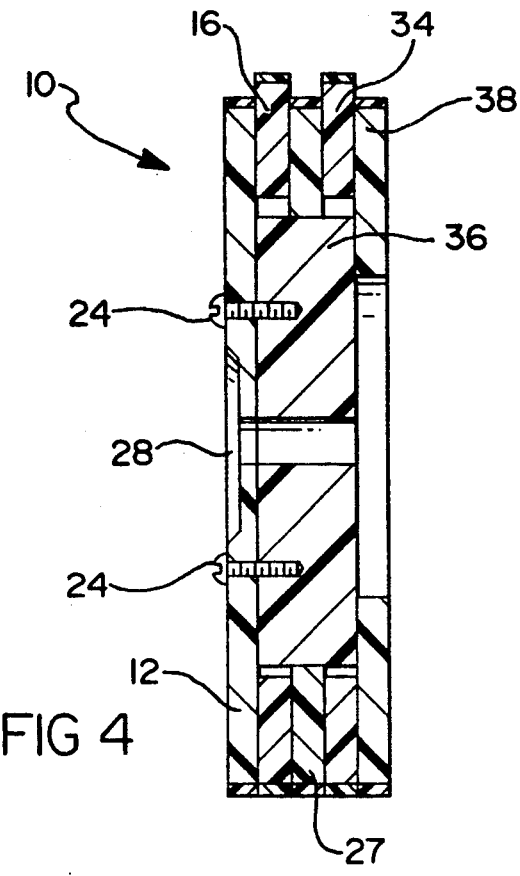
FIG. 4 is a cross-sectional view of a further embodiment of the present invention that uses two clearing discs.
Figure 5:
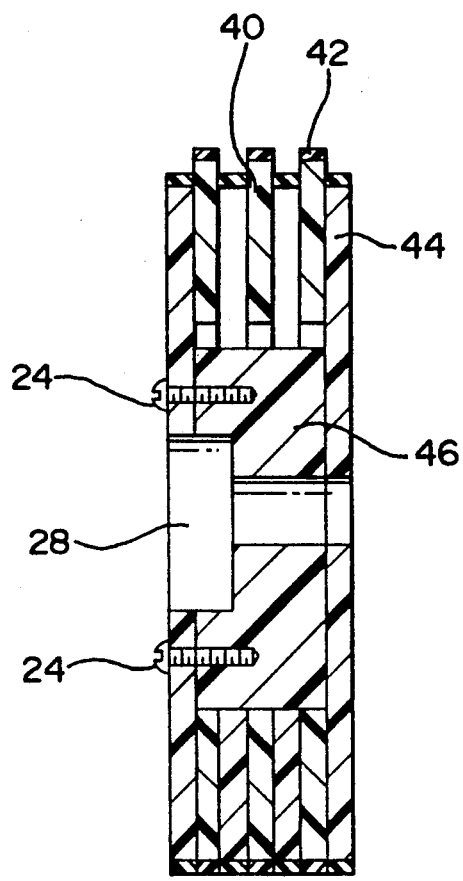
FIG. 5 is a cross-sectional view of a still further embodiment of the present invention that uses three clearing discs.

With reference to FIG. 4, a further embodiment of the present invention is illustrated. In FIG. 4, an additional clearing disc 34 is added to the wheel assembly 10. The wheel assembly 10 of this embodiment has a spacer means 36 extending outwardly from an additional support wheel 38. In this embodiment, the middle support wheel 39 has an inside diameter that is generally equal to spacer 36 and discs 16 and 34 have inside diameters greater than spacer 36. As should be appreciated, the embodiment of FIG. 4 could have narrower support wheels and clearing discs because the width of the wheel assembly is divided between more elements. Conversely, the increased number of elements can provide a wider wheel assembly. With reference to FIG. 5, the wheel assembly includes additional clearing discs 40 and 42 and additional support wheels 44 and 46. Again, the additional elements can either provide a wider wheel 10 or a wheel assembly 10 with narrower elements.

With reference to FIG. 6, a further embodiment of the wheel assembly 10 is illustrated having the support wheels 48 formed integrally to the spacer means 50. The clearing disc 52 is again an annular ring that is received within the space formed between the support wheels 48. In this embodiment, the spacer means 50 and rim 54 would preferably be formed of plastic and the tires 56 would be formed of rubber. The clearing disc 52 in this embodiment would also be formed of plastic and the tire 56 mounted to the clearing disc would preferably be formed of rubber.

The assembly 10 of FIG. 6 can be assembled by opening the clearing disc 52, that is separating the free ends of the annular ring that defines the clearing disc, and slipping it over the spacer 50. The ends of the disc 52 can then be connected by for example gluing, bolting, fusing, or welding. The rubber tire 56 can then be mounted over the disc 52 to complete the assembly. As should be appreciated, those of ordinary skill in the art will recognize other methods of assembly which are intended to be included within the scope of this invention.

Figure 7:
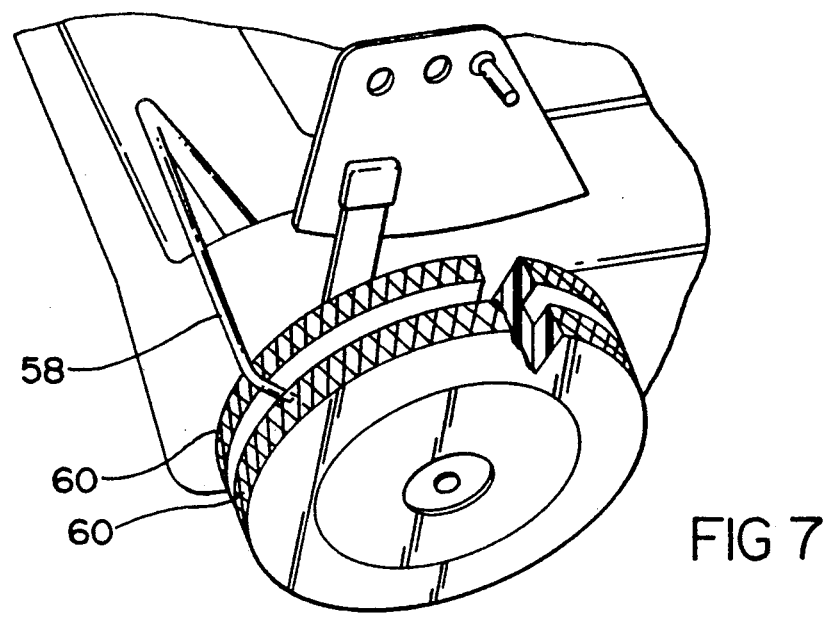
FIG. 7 illustrates an embodiment of the present invention wherein a clearing rod is used to replace the clearing disc.

With reference to FIG. 7, a further embodiment of the present invention is illustrated. In this embodiment, the clearing disc of the previous embodiment is replaced by a clearing rod 58. The clearing rod 58 is received in the space formed between the support wheels 60. The wheels are spaced in the same manner as previously described above. The wheel assembly of FIG. 7 clears accumulated grass from the wheel as it rotates.

Figure 8:
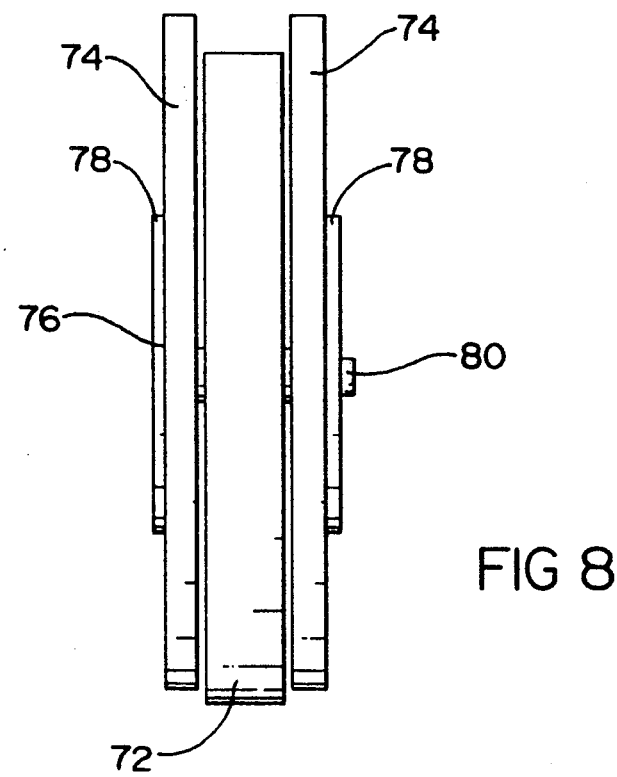
FIG. 8 is a plan view of a mower wheel with a fixed wheel with the slip disc on the sides.

With reference to FIG. 8, a further embodiment of the present invention is illustrated. With reference to FIG. 8, a support wheel 72 is sandwiched between clearing discs 74. The assembly is held together by washers, or mounting discs 76 and 78. Shaft 80 extends outwardly from first mounting disc 76 and is received by second mounting disc 78. A cotter pin or other connecting means is used to lock the shaft 80 in place. As in the previous embodiments, the clearing discs 74 are annular in shape and have an inside diameter which is greater than shaft 80. In this embodiment, the inside diameter of the clearing disc is much larger than the outer diameter of shaft 80 to insure that the discs do not carry any load and are therefore freer to move with respect to support wheel 72. Further, in this embodiment, support wheel 72 is wider than in previous embodiments, it should be understood that the width of support wheel 72 could be varied as well as the width of the clearing discs 74.

It is to be understood that the embodiments described herein are merely illustrative of the general principals of the invention. Numerous variations and modifications may be made by those skilled in the art. For example, different materials may be used for the support wheels, clearing discs, and tires. Also, different of the mounting hubs may be used so that the wheel assembly can be mounted to any mower. Other modifications will be apparent to those of ordinary skill in the art. The present invention is not to be limited to the particular forms herein shown and described except insofar as indicated by the scope of the following claims.

What is claimed is:

1. A wheel assembly for use on a mower for reducing the accumulation of grass clippings on the mower wheels, said wheel assembly comprising:
   at least an outer wheel and an inner wheel each having substantially the same outer diameter, said outer and inner wheels being coaxially mounted upon said mower such that said mower is supported upon said outer and inner wheels;
   clearing means for clearing away accumulated grass, said clearing means being mounted between said outer and inner wheels to clear away grass clippings as said mower is propelled, said clearing means being a clearing disc having an outer diameter that is greater than the outer diameter of said inner and outer wheels, said clearing disc being mounted for generally vertical movement with respect to said inner and outer wheels such that said clearing disc clears accumulated grass from said wheel assembly;
   whereby, as said mower is propelled, said clearing means is constantly forced between said inner and outer wheels to dislodge grass clippings that are accumulating on said wheel assembly.

2. The wheel assembly of claim 1, wherein said outer and inner wheels are separated by a spacer means, said clearing means having an opening for receiving said spacer means, said opening having a diameter that is greater than the outer diameter of said spacer means such that said clearing means can move vertically with respect to said inner and outer wheels.

3. The wheel assembly of claim 2, wherein said outer and inner wheels and said spacer means are integrally formed.

4. The wheel assembly of claim 1, wherein said wheel assembly includes a spacer means, said clearing disc having an opening for receiving said spacer means, said opening having a diameter that is greater than the outer diameter of said spacer means such that said clearing disc is forced upwardly as said mower is propelled such that the upper portion of said clearing disc is normally above the outer perimeter of said inner and outer wheels as said mower is propelled.

5. The wheel assembly of claim 1, further including a plurality of support wheels and a plurality of clearing discs.

6. The wheel assembly of claim 1, wherein said mower includes a plurality of said wheel assemblies.

7. A wheel assembly for use on a mower for reducing the accumulation of grass clippings on the mower wheels, said wheel assembly comprising:
   at least one weight bearing wheel mounted upon said mower such that said mower is supported upon said wheel;
   a clearing disc mounted adjacent said wheel to clear away grass clippings as said mower is propelled, said clearing disc having an outer diameter that is greater than the outer diameter of said wheels, said clearing disc being mounted for movement with respect to said wheel;
   whereby, as said mower is propelled, said clearing disc is constantly forced vertically with respect to said wheel to dislodge grass clippings that are accumulating on said wheel assembly.

8. The wheel assembly of claim 7, wherein said wheel assembly includes a means for mounting said clearing disc adjacent to said support wheel, said clearing disc having an opening for receiving said mounting means, said opening having a diameter that is greater than the outer diameter of said mounting means such that said clearing disc is forced upwardly as said mower is propelled such that the upper portion of said clearing disc is normally above the outer perimeter of said support wheel as said mower is propelled.

9. An improved mower comprising:
   a plurality of wheel assemblies mounted upon said mower;
   said wheel assemblies including at least a pair of support wheels for supporting said mower, said support wheels defining a space between them, said support wheels including at least an outer wheel and an inner wheel each having substantially the same outer diameter, said outer and inner wheels being coaxially mounted upon said mower such that said mower is supported upon said outer and inner wheel;
   a clearing means positioned in said space for clearing accumulated grass from said support wheels as said support wheels rotate, said clearing means including a clearing disc mounted between said outer and inner wheels to clear away grass clippings as said mower is propelled, said clearing disc having an outer diameter that is greater than the outer diameter of said inner and outer wheels;
   whereby, as said mower is propelled said clearing means clears grass from said support wheels.

10. The mower of claim 9, wherein said clearing disc is mounted for vertical movement with respect to said inner and outer wheels.

11. The wheel assembly of claim 9, wherein said support wheels are mounted to a spacer means with said clearing disc being mounted about said spacer means between said support wheels with the inner diameter of said clearing disc being greater than the outer diameter of said spacer means such that said clearing disc is free to move with respect to said spacer means and said support wheels.

12. The wheel assembly of claim 11, wherein said spacer means and said support wheels are integrally mounted.

13. A wheel assembly for use on a mower for reducing the accumulation of grass clippings on the mower wheels, said wheel assembly comprising:
   at least an outer wheel and an inner wheel each having substantially the same outer diameter, said inner and outer wheels being coaxially mounted upon said mower such that said mower is supported upon said inner and outer wheels, said inner and outer wheels defining a space between them;
   a rod for clearing away accumulated grass, said rod being mounted on said mower and extending from said mower into said space to clear accumulated grass clippings from said inner and outer wheels;
   whereby, as said mower is propelled, said rod is constantly forced between said inner and outer wheels to dislodge grass clippings that are accumulating on said wheel assembly.

14. A wheel assembly for use on a mower for reducing the accumulation of grass clippings on the mower wheels, said wheel assembly comprising:
   at least an outer wheel and an inner wheel each having substantially the same outer diameter, said outer and inner wheels being coaxially mounted upon said mower such that said mower is supported upon said outer and inner wheels, said inner and outer wheels defining a space between them;
   a clearing means for clearing away accumulated grass, said clearing means positioned between said outer and inner wheels to clear away grass clippings as said mower is propelled;
   whereby, as said mower is propelled, said clearing means is constantly forced between said inner and outer wheels to dislodge grass clippings that are accumulating on said wheel assembly.

15. The wheel assembly of claim 14, wherein said clearing means is a clearing disc mounted between said inner and outer wheels, said clearing disc having an outer diameter that is greater than the outer diameter of said inner and outer wheels, said clearing disc being mounted for generally vertical movement with respect to said inner and outer wheels such that said clearing disc clears accumulated grass from said wheel assembly.

16. The wheel assembly of claim 14, wherein said clearing means is a rod, said rod mounted at a fixed location on said mower and extending between said inner and outer wheels.

17. The wheel assembly of claim 14, wherein said support wheel includes a spacer means separating said inner and outer wheels, said inner and outer wheels, and said spacer means being integrally formed.

18. The wheel assembly of claim 14, further including a plurality of inner and outer wheels and a plurality of clearing means.

* * * * *